Figure 1:
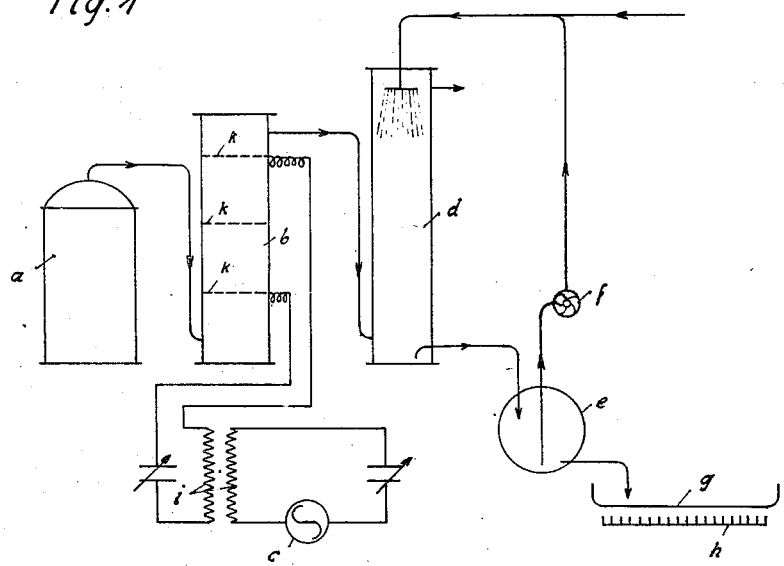

Oct. 10, 1933.    P. NASHAN    1,930,210
PROCESS FOR PREPARING HEXAMETHYLENE TETRAMINE FROM METHANE
Filed April 14, 1930

Inventor
Paul Nashan
B. Linger, Atty.

UNITED STATES PATENT OFFICE 1,930,210

PROCESS FOR PREPARING HEXAMETHYLENE TETRAMINE FROM METHANE

Paul Nashan, Oberhausen, Rhineland, Germany, assignor to firm: Gutehoffnungshütte Aktiengesellschaft, Oberhausen, Rhineland, Germany Application April 14, 1930, Serial No. 444,277, and in Germany January 7, 1929

2 Claims. (Cl. 204—31)

The invention relates to the preparation of hexamethylene tetramine ($C_6H_{12}N_4$) from methane, methane and a gas mixture containing both nitrogen and oxygen being conducted through an electrode field, whereby periodicity, pressure, capacity of the field, ratio of volumes and velocity of the mixing gas, also material and construction of the electrodes and intermediate electrodes are arranged suitable for the purpose.

Berthelot already suggested that these starting products could be used to furnish tetramines without, however, indicating any process for the production on a larger scale, and particularly he did not indicate any method of producing hexa-methylene-tetramine.

It has been found that in fact hexa-methylene-tetramine may be produced in addition to formaldehyde from gases containing methane, nitrogen, and oxygen, for instance air, provided these gases are subjected either by themselves or in mixture with other gases, for instance in mixture with coke-gases, to the electric discharges of a high tension, high frequency, vibrating field. The two products made in this manner may be cleaned in a washer and may be enriched by conducting them repeatedly through the apparatus, so that upon evaporating the solution, the solid body recovered is the compound hexa-methylene-tetramine, while formaldehyde is liberated as vapor in order to be used in some suitable way.

Methane and air may be mixed at a ratio ranging from 1:1 to 1:10. The capacity of the electric field depends upon the frequency of the currents, while the velocity of the mixing gas may be 0.5 to 600 meters per second and still higher. The electrodes and intermediate electrodes, for which by way of example, copper, silver, nickel, iron, chromium or other alloys are adapted, are formed as nets, screens or tubular coils in order to provide for a high degree of distribution.

Example 1:—A gas mixture consisting of 1 part of methane and 5 parts of air is conducted at a velocity of 40 cm. per second through a glass tube in which an electric field is formed by high-frequency currents having a periodicity of 1,000,000 and a voltage of 500,000 between two copper electrodes and an intermediate electrode made of a silver-copper alloy. In addition to formaldehyde, considerable volumes of hexamethylene tetramine ($C_6H_{12}N_4$) are present in the condensed water, the yields in figures per cub. m. of methane being 65 gr. of formaldehyde and 1.5 gr. of hexamethylene tetramine.

Example 2:—With a periodicity of 500,000 and a voltage of 100,000, the ratios in other respects being identical with those of Example 1, the yield is 48 gr. of formaldehyde and 1.1 gr. of hexamethylene tetramine.

Example 3.—With a periodicity of 100,000 and a voltage of 100,000, in other respects same as Example 1, the yield is 21 gr. of formaldehyde and 0.7 gr. of hexamethylene tetramine.

Example 4.—When using an intermediate electrode of constantan, in other respects same as Example 2, the yield is 52 gr. of formaldehyde and 0.8 gr. of hexamethylene tetramine.

Example 5.—At a flow velocity of 20 cm. per second, in other respects same as Example 1, the yield is 58 gr. of formaldehyde and 1.7 gr. of hexamethylene tetramine.

The reactions of the electric high frequency vibrating field are very complicated and have not been fully explained theoretically and scientifically. Possibly the conditions may be explained by assuming that temporarily nitrogen monoxide is formed by synthesis and that this new compound is very readily decomposed, further assuming the strong reducing action of the hydrogen in statu nascendi from the splitting up of the methane, leading to the formation of ammonia, particularly if there is present a metal or metals, as copper, iron, nickel, chromium, silver and their alloys, which metals may be used as intermediary electrodes. This ammonia together with the formaldehyde which is produced at the same time is then directly converted into hexa-methylene-tetramine.

The reaction seems to take place in accordance with the following scheme:

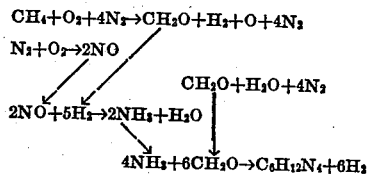

For practically carrying out the method, I produce visible discharges, as for instance discharges in the form of luminous pencils between two electrodes by means of high tension, high frequency currents. The gas mixture from which the new compound is to be produced is conducted through these discharges. In the experiments made, introduction electrodes in the form of discs were used, and between these electrodes there were located intermediary electrodes preferably made of conducting substances. Another scheme was to position one electrode or a plurality of tubular electrodes in the form of a set of tubes insulated, locating them approximately in the gases of a metal tube or of a tube made of a non-conductor. The tube at the same time serves then as a wall for the reaction chamber to conduct the mixture of the gases. Between these electrodes there is then mounted an electrode of the same shape having, however, no current conducted thereto. This additional electrode serves as an intermediary electrode.

The material for the electrodes and intermediary electrodes was copper, iron, nickel, silver, chromium and their alloys and mixtures.

A method has heretofore been proposed with the object of producing alcohols, aldehydes and the like from hydrogen. In this prior proposed method methane, for instance, was supposed to be converted into formaldehyde by forming first methyl alcohol. This process made use of dark, non-visible discharges in the presence of activated charcoal. It seems, however, that this method did not permit production of compounds of definite composition, and particularly the method did not furnish hexa-methylene-tetramine. In this prior method, as contrasted with the present application, the inventors did not make use of high frequency, high tension alternating current, and they did not use a vibratory field of non-dampened, high frequency discharges.

Figure 2:
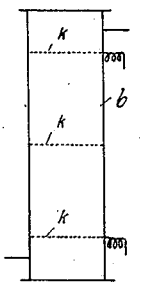
Figure 5:
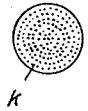
Figure 3:
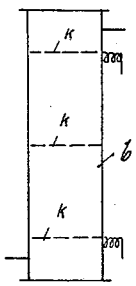
Figure 6:
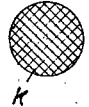
Figure 4:
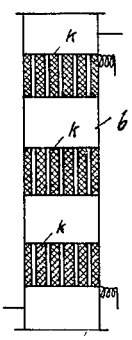
Figure 7:

An example of carrying out the process is shown in elevation in Fig. 1, while Figs. 2, 3 and 4 show different constructions of the electrodes used, and Figs. 5, 6 and 7 corresponding cross sections. The mixing gas is conducted to the high-frequency field $b$, which consists of three parts, from the gas holder $a$, the electrodes $kk$, which are fed from the high-frequency generator $c$ over the self-induction coils $l$, being arranged in the high-frequency field $b$. The gas mixture is washed with fresh water in an adjoining washer $d$, and escapes from the washer as waste gas, while the lye flows into the container $e$, from which it is extracted by a centrifugal pump $f$, and sprayed together with the fresh water into the washer $d$ and thus enriched. The final product is then won in a solid state by means of a crystalizing pan $g$ heated by a heating device $h$.

According to the constructions shown in Figs. 2 and 5, the electrodes are formed as screens, while Figs. 3 and 6 show the electrodes in the form of nets, Figs. 4 and 7 showing them formed as tubular coils. In any case provision should be made for a high degree of distribution.

What I claim is:

1. Method of producing hexa-methylene tetramine ($C_6H_{12}N_4$) from methane, nitrogen and oxygen, consisting in mixing the reagents or gases containing these ingredients with each other, conducting the mixed gas through the visible non-dampened discharges of high tension, high frequency, alternating current to produce hexa-methylene-tetramine and formaldehyde, washing out the same and heating the same in a crystallizing tray, to thereby secure the hexa-methylene-tetramine in solid form.

2. Method of producing hexa-methylene-tetramine ($C_6H_{12}N_4$) from methane, nitrogen and oxygen, as set forth in claim 1, characterized in that the electrodes and intermediary electrodes are made from a metallic substance from the group consisting of copper, silver, nickel, iron, chromium and their alloys which have a catalytic effect on the reaction.

PAUL NASHAN.